United States Patent Office 2,883,285
Patented Apr. 21, 1959

2,883,285

PROCESS OF MAKING BREAD-LIKE BAKED GOODS

Richard Lubig, Bonn am Rhine, Germany

No Drawing. Application May 23, 1955
Serial No. 510,569

16 Claims. (Cl. 99—90)

The present invention relates to new bread-like baked goods and more particularly to new bread-like baked goods containing a high percentage of hydrolyzed carbohydrates, and to a process of making same.

It is one object of the present invention to provide new bread-like baked goods of highly improved nutritional and dietetic value, said goods containing a high percentage of low-molecular carbohydrates obtained by hydrolysis of higher-molecular carbohydrates and being more readily and more completely digestible and assimilable by the human digestive tract.

Another object of the present invention is to provide a process of making such new bread-like baked goods.

Other objects of the present invention and advantageous features thereof will become apparent as the description proceeds.

In principle, the process according to the present invention comprises a multi-step preliminary treatment of the grain before baking.

In the first reaction step of said process coarsely ground cereals are subjected to a swelling treatment with water at elevated temperature, preferably at a temperature between about 80° C. and about 100° C. and most advantageously at a temperature of 100° C. During said swelling treatment the mixture is aerated and irradiated by means of actinic rays while excluding foreign microorganisms. Care must be taken that the cereals, during this step, are continuously turned over so as to ensure exposure of the entire mass to the action of said actinic rays.

In the second reaction step, said pretreated swelled coarsely ground, aerated, and irradiated cereals are mixed with flour or coarsely ground cereals which have also previously been subjected to the swelling action of water of elevated temperature, preferably of a temperature between about 80° C. and about 100° C. and most advantageously of a temperature of 100° C. Thereby the flour is also exposed to the action of actinic rays.

In the third reaction step the resulting dough mixture is cooled and subjected to a fermentation process in the presence of phosphatides.

Preferably a fourth reaction step follows whereby said initial fermented phosphatide containing dough is again mixed with flour or coarsely ground cereals which has previously been subjected to the swelling action of water of elevated temperature while being exposed to irradiation, and the resulting mixture is again subjected to a fermentation process in the presence of phosphatides as in the third reaction step.

This process of adding swelled and irradiated flour to the fermented dough and fermentation of the mixture in the presence of phosphatides is preferably repeated. It is advisable to proceed in this manner and to subdivide the fermentation step into several steps in order to avoid formation of undesired ferments.

The resulting dough is then adjusted to the desired consistency and is finally baked in suitable molds preferably according to the steam baking process.

The characteristic feature of the present invention, as is evident from the preceding general description of the process, is to be seen in the preparation of a specific dough in a controlled manner whereby said process is subdivided in several specific steps. By the combination of said steps a dough is obtained which, on subsequent baking under steam pressure, yields bread-like baked goods of the above indicated advantageous properties.

The starting material which yields best results is composed of coarsely ground cereals. Especially suitable is a mixture of such coarsely ground cereals, such as rye, oat, wheat and/or barley.

In the first reaction step a certain degradation of the protein present in the coarsely ground cereal and also heat and steam hydrolysis of the cellulose and starch is achieved. Care must be taken, however, that too far a degradation of the cereal gluten is avoided. This is accomplished by conducting the preliminary treatment with water, preferably at 100° C., in such a manner and under such conditions that the capability of the gluten to swell is preserved, so that, on subsequent baking, a satisfactory bread volume is achieved. The temperature must not decrease below about 80° C. during this first reaction step.

Preferably extracts of suitable plant material, such as extracts of vegetables, drugs, and spice plants are added during this first reaction step. Especially suitable are extracts which are obtained by boiling such plant material in water and separating the undissolved matter from the resulting solution. Decoctions from root vegetables such as carrots, tannic acid containing extracts from spinach, teas prepared from sweet marjoram, elderberries, peppermint, and the like, are, for instance, such valuable additions to the coarsely ground cereal during the preliminary swelling treatment.

Spinach decoctions are obtained, for instance, by first washing and then boiling the washed spinach. Such a decoction is especially suitable and may replace part of the water used for dough formation. Carrots are first steamed and then pressed. The press juice obtained thereby represents another very suitable addition.

The amounts of said extracts to be added are comparatively small. Amounts of 0.1 to 0.5% and preferably of 0.2%, ordinarily, yield satisfactory results. They may, of course, vary and may also be higher although, in general, such higher amounts will not further improve the properties of the resulting bread-like baked goods.

The coarsely ground cereal, the water, and the extracts of plant material are thoroughly mixed and kneaded preferably in a suitable rotating large area mixer provided with a jacket permitting heating of the mixer. The mixture is preferably exposed to the action of water of 100° C., if required, under superatmospheric pressure. At the same time the mixture is thoroughly aerated whereby the air introduced into the mixture must be carefully sterilized.

Mixing and aeration are carried out while subjecting the mixture to the action of actinic rays. Actinic rays which have proved to be suitable for the purpose of the present invention are not only light of short wavelength but also light of long wavelength. Thus, the mixture may be irradiated with light in the spectral range from ultraviolet to infrared. Irradiation is preferably carried out intermittently. A preferred procedure consists, for instance, in exposing the coarsely ground cereal in intervals of two minutes for half a minute to the action of such actinic rays.

By continuously turning over and over the mixture during irradiation care must be taken that the actinic rays affect all particles of said mixture. This is a very important feature of the present process since, ordinarily, actinic rays, especially ultraviolet rays, do not penetrate deeply into the mass and, thus would irradiate only the most superficial layers thereof.

The total amount of water added and intimately admixed to the coarsely ground cereal is, of course, dependent on the type of cereal used and can readily be determined by preliminary tests. Amounts from one quarter to one half of the amount of cereal employed have proved to be sufficient in this first step of the process according to the present invention. Preferably so much water is added in the first reaction step that subsequently further amounts of flour must be added in the following reaction steps in order to achieve the required dough consistency.

It is also possible to first irradiate the coarsely ground cereal without the addition of water and thereafter to admix thereto water of elevated temperature, preferably, of 100° C. while continuing irradiation.

Swelling of the coarsely ground cereal by means of hot water with simultaneous irradiation and aeration requires considerable time. It was found that amounts of 200 kg. of said cereals require normally about 10 hours to produce the desired swelling effect and satisfactory degradation and hydrolysis of the protein, cellulose and starch. The pretreated coarsely ground cereal is then ground and/or crushed to reduce its particles to the desired size.

The flour to be admixed to the material obtained in the first reaction step is obtained by subjecting said flour in the same manner as described for the first reaction step to the swelling action of water at elevated temperature, preferably at a temperature between 80° C. and 100° C. while continuously turning over and over and irradiating the resulting dough with light of short and/or long wavelength. It is also possible to subject the flour during said irradiation to a higher temperature and steam pressure, for instance, to a temperature of 150° C. whereby, of course, the time of pretreatment is considerably reduced, for instance, to 20 minutes.

Both swelled and irradiated materials are preferably cooled to about 40° C. and are then thoroughly and intimately mixed with each other. During this second mixing step care must also be taken that detrimental germs are excluded, preferably by working in closed or covered mixers. Especially suitable are mixers as they are described in German Patent No. 715,753. Other mixers as they are conventionally employed in the preparation of dough may, of course, also be used.

The pretreated flour is added to the cereal material pretreated according to the first reaction step in such amounts that proper dough consistency is achieved.

The resulting mixture is then subjected to fermentation preferably with the addition of phosphatides. Fermentation is effected by means of lactic acid bacteria preferably at a temperature between about 25° C. and about 60° C. and most advantageously at a temperature of about 40° C. For this purpose nutrient materials as they are ordinarily used for lactic acid fermentation, such as buttermilk, lactose, whey, or the like are admixed to the dough. Such nutrients are preferably added in an amount that their dry content is approximately 4% of the total amount of flour present in the mixture. The mixture is inoculated with a culture of lactic acid bacteria, which has been prepared separately on a conventional nutrient medium, for instance, on a nutrient medium composed of whey and wheat germs. Said lactic acid bacteria culture is preferably used after cultivation for 72 hours, when maximum activity is attained.

To avoid formation of undesired ferments, it is advisable to carry out said fermentation step by subdividing the mixture into small batches, for instance, into batches of 0.5 kg. each. Fermentation is interrupted as soon as the required degree of degradation and hydrolysis is attained. A fermentation duration of about 3 hours usually is sufficient.

According to a prefered mode of operation, the fermented mixture is again mixed with irradiated flour and the mixture is subjected to fermentation. In this fourth reaction step, 5 kg. of irradiated flour and 5 kg. of water are added and admixed to each 0.5 kg. of fermented mixture and the resulting mixture is again subjected to fermentation for about four hours.

This procedure is repeated in a fifth reaction step by again adding and admixing 5 kg. of irradiated flour to each 0.5 g. of fermented mixture obtained in the fourth reaction step. Phosphatides may also be added in this step.

By proceeding in such a manner and subdividing the fermentation step into several fermentation periods it is possible to properly control dough preparation and to achieve the desired degradation and hydrolysis.

The phosphatides are preferably added in the form of the juice of onions and garlic. It is, of course, understood that other phosphatide containing material may also be used in place of such onion and garlic juice.

During all these operations, the cereal, flour, and their mixtures are preferably continuously agitated and kneaded.

The resulting fermented dough batches are then mixed with each other and the dough is extruded by a preferably automatic extrusion press into suitable molds. For instance, 4 kg. of said dough are filled into a rectangular mold. Said mold is placed into a steel box filled with 250 cc. of water. The molds are preferably provided with thin wire pins which enable regulation of the steam generated during the baking process and which cause more complete hydrolysis of the dough components. Said steel boxes are tightly closed and are baked at 160° C. usually for about 4 hours. After releasing the pressure, steam-baking is continued for 24 hours to 30 hours depending on the properties of the crude fiber of the cereals employed.

Thereafter, the baked goods are removed from the molds, allowed to give off vapors for 4 hours, thereafter subjected to low temperature cooling for 12 hours, sliced, and wrapped, preferably into two-ply paper, the one layer thereof consisting of wax paper and the other layer of aluminum foil backed thereto. Preferably, the wrapped bread-like baked goods are sterilized for one hour.

It is an important advantage of the present invention that salt addition to the dough is not required and that, in spite of the absence of salt, the baked goods have a satisfactory resistance to slicing, i.e. they remain firm on slicing and do not crumble. This is rather surprising because it is known that, ordinarily, salt increases the firmnes of the protein framework and that normal bread poor in salt is crumbly and has a flat, stale taste.

The above described multi-step process of preparing a specific type of dough and of baking said dough to produce novel bread-like baked goods, as stated above, effects very considerable hydrolysis of the components of the cereal grain, namely of the cellulose, starch, and the proteins contained therein. The specific manner of carrying out this process according to the present invention results in a substantial preservation of the vitamins. The vitamin content of the new bread-like baked goods is considerably higher than in normal bread. The action of bacteria and enzymes, and the hydrolyzing effects due to the prolonged action of steam and increased temperature convert the cellulose and the starch into degradation products to an extent heretofore not attainable in normal bread. The high content of hydrolyzed carbohydrates and especially of lactose is an essential feature of the present invention.

The following table is given to illustrate the differences in the carbohydrate composition of the bread-like preparations according to the present invention in comparison with normal bread:

|  | Invention, percent | Normal bread, percent |
|---|---|---|
| Starch soluble in hydrochloric acid | 3.8 | 0.5 |
| Starch insoluble in hydrochloric acid | 10.0 | 4.7 |
| Fermentatively soluble starch | 7.8 | 35.2 |
| Sugar calculated as lactose | 14.2 | 1.4 |
| Dextrines | 8.0 | 1.4 |
| Lactic acid | 5.2 | 2.1 |
|  | 49.0 | 45.3 |

As mentioned above, the bread-like preparations obtained according to the present invention can be sliced, wrapped under sterile conditions, and placed on the market for consumption. It is, however, also possible to employ the resulting dough as filler material for the preparation of soups, deserts, confectionery, candies, and other products of the food industry, of dog-biscuits and for other purposes.

It follows from the preceding explanation that the multi-step process of producing the novel and valuable bread-like preparations according to the present invention is characterized by the following features:

(1) Coarsely ground cereals are subjected to a swelling treatment with water of elevated temperature not lower than 80° C. and preferably of 100° C. whereby the cereals are simultaneously aerated and irradiated with light of short and/or long wavelengths and are continuously turned over and over during said treatment. Said pretreatment is preferably carried out with the addition of plant extracts.

(2) The resulting pretreated cereals are mixed with flour which was previously treated with water at elevated temperature, preferably with boiling water and was irradiated. They are, thereby, converted into a dough of the required consistency.

(3) Said dough is subjected to a fermentation process, preferably by means of lactic acid bacteria, in the presence of phosphatides whereby the dough may be irradiated during fermentation. Preferably nutrients adapted for the cultivation of lactic acid bacteria are added to the dough.

(4) The resulting initial fermented dough is preferably again repeatedly mixed with additional amounts of pretreated flour and the resulting mixture is again subjected to fermentation whereby the final dough of the proper consistency is produced.

During all these steps the mixtures and the dough must be protected against admission of foreign microorganisms.

(5) The resulting dough is then baked, preferably according to the steam baking process.

The following examples serve to illustrate the present invention without, however, limiting the same thereto.

*Example 1*

200 kg. of coarsely ground whole grain composed of 80 kg. of rye. 70 kg. of oat, 25 kg. of wheat, and 25 kg. of barley are mixed with 400 g. of an aqueous decoction of carrots, spinach, marjoram, elderberries, and peppermint and are digested in a large area mixer with about 50 l. of water of a temperature of about 100° C. for 10 hours. During said digestion, sterilized air is introduced into and forced through the mass which is intermittently irradiated in intervals of 2 minutes with ultraviolet light, each time for half a minute. The mixture is continuously and thoroughly turned over and over so as to expose all of it to the action of ultraviolet light. Said pretreatment is carried out in a double-walled mixer which permits heating and, thus, maintaining the temperature during irradiation. Care must be taken that access of harmful microorganisms is prevented.

After said irradiation treatment at 100° C. the coarsely ground cereal mixture is further comminuted and flour is added and admixed in such an amount that the desired dough consistency is attained. The flour, before its addition, was also treated with boiling water and irradiated with ultraviolet light as described above for the coarsely ground whole grain. Admixture of said pretreated flour is effected at the boiling temperature of water. The temperature during the above mentioned first reaction step and during this second flour-admixing step must not be lower than 80° C. Furthermore, care must be taken that no infection of the resulting mash can take place.

The resulting mash is then subjected to a fermentation process with the addition of phosphatides. To ensure proper and rapid fermentation and to prevent formation of undesired ferments, the mash is subdivided into small batches whch are separately fermented. Fermentation is interrupted as soon as the desired degree of fermentation is achieved. The fermentation requires, as an average, 3 hours.

Each individual batch of mash is then again thoroughly mixed with about 10 times its amount of flour which has been pretreated with hot water and ultraviolet light, and 10 times its amount of water, i.e. a batch of 0.5 kg. of mash is mixed with 5.0 kg. of pretreated flour and 5.0 l. of water. Said mixing is also effected at the boiling temperature of the water. Subsequently, the resulting mash is subjected to fermentation for about 4 hours.

The resulting batches of dough are then again mixed with the same amount of pretreated flour and water as used in the preceding step whereby the temperature is kept at 100° C. Thereafter, the mixed dough is again fermented with the addition of phosphatides, after cooling to about 40° C. Fermentation is discontinued after about 4 hours.

All the separate batches of dough are then mixed with each other and the dough is filled into box-like molds and baked in steam baking ovens at a temperature below 160° C. for 24 hours to 30 hours.

*Example 2*

200 kg. of coarsely ground whole grain composed of 80 kg. of rye, 70 kg. of oat, 25 kg. of wheat, and 25 kg. of barley are mixed with 400 g. of an aqueous decoction of carrots, spinach, marjoram, elderberries, and peppermint and are digested with about 50 l. of water at a temperature of about 100° C. in a large area mixer for 10 hours while simultaneously aerating the mixture with sterilized air and irradiating it with infrared light. Thereafter the mixture is mashed and 30 l. of boiling water are additionally sprayed thereover and mixed therewith.

To the pretreated mixture there is added buttermilk and lactose in an amount that the proportion of the dry content of said addition to the total amount of flour is about 4%. During said admixture the mass is continuously turned over in the kneading and mixing machine until the dough is concentrated by evaporation to such an extent that it attains a semisolid consistency. This is achieved after about 3 more hours at a decreased temperature of 40° C.

17 kg. of a culture of lactic acid bacteria cultivated on whey and wheat germs and 50 cc. of onion and garlic juice are added to said dough at a temperature of 40° C. Irradiation is discontinued and the dough is intimately mixed with said lactic acid bacteria culture and converted into a dough of the desired consistency, requiring 30 more minutes.

The resulting dough is then immediately extruded through an automatic extrusion press and is weighed. 4 kg. of said dough are filled into a rectangular mold which is placed into a steel box as they are conventionally used in steam pressure baking ovens. The tightly closed steel box is then baked at 160° C. for 4 hours, the pressure is released, and baking is continued for 24 hours to 30 hours.

Thereafter, the baked goods are removed from the mold and are allowed to give off vapors for 4 hours. After cooling the goods to a low temperature, they are sliced, wrapped in two-ply paper consisting of wax paper and aluminum foil-backed paper, and sterilized for 1 hour.

*Example 3*

200 kg. of coarsely ground whole grain composed of 80 kg. of rye, 70 kg. of oat, 25 kg. of wheat, and 25 kg. of barley are mixed with 400 g. of an aqueous decoction of carrots, spinach, marjoram, elderberries, and peppermint and are digested with about 50 l. of water of a temperature of about 100° C. in a large area mixer for 10 hours while simultaneously aerating the mixture with sterilized air and irradiating it with ultraviolet light.

Thereafter the mixture is mashed and 30 l. of boiling water are additionally sprayed thereover and mixed therewith.

Flour is then added and admixed to said mash in such an amount that the desired dough consistency is attained. The flour, before its addition, was also treated with boiling water and irradiated with ultraviolet light as described above for the coarsely ground whole grain. Admixture of said pretreated flour is effected at the boiling temperature of water. The temperature during the above mentioned first reaction step and during this second flour-admixing step must not be lower than 80° C. Furthermore, care must be taken that no infection of the resulting mash can take place.

To the pretreated mixture there is added whey in an amount that the proportion of the dry content of whey to the total amount of flour is about 4%. During said admixture the mass is continuously turned over. Fermentation is effected by means of lactic acid bacteria and onion and garlic juice as described in Example 2. To insure proper and rapid fermentation and to prevent formation of undesired ferments, the mash is subdivided into small batches which are separately fermented. Fermentation is interrupted as soon as the desired degree of fermentation is achieved. The fermentation requires, as an average, 3 hours.

Each individual batch of mash is then again thoroughly mixed with about 10 times its amount of flour which has been pretreated with hot water and ultraviolet light, and 10 times its amount of water, i.e. a batch of 0.5 kg. of mash is mixed with 5.0 kg. of pretreated flour and 5.0 l. of water. Said mixing is also effected at the boiling temperature of the water. Subsequently the resulting mash is subjected to fermentation for about 4 hours.

The resulting batches of dough are then again mixed with the same amount of pretreated flour and water as used in the preceding step whereby the temperature is kept at 100° C. Thereafter, the mixed dough is again fermented with the addition of onion and garlic juice after cooling to about 40° C. Fermentation is discontinued after about 4 hours.

All the separate batches of dough are then mixed with each other and the dough is filled into box-like molds and baked in steam baking ovens at a temperature below 160° C. for 24 hours to 30 hours.

In place of flour treated with boiling water and irradiated before the addition to the pretreated coarsely ground cereal material, there can be used with similar results flour which was subjected to the action of steam at a temperature of 150° C. for about 20 minutes and was simultaneously irradiated with ultraviolet or infrared rays while otherwise the procedure is the same as described hereinbefore.

In place of the plant extracts mentioned in the examples, there can be used extracts and decoctions from other plants, such as from *Berbera vulgaris, Origanum major, Pimpinella major, Matricaria chamomilla, Arnica montana*.

In place of onion and garlic juice added to the fermenting dough there can be admixed other materials supplying phosphatides.

Of course, many other changes and variations in the starting material, the materials to be added, the temperature and duration, the amounts of added flour, water, plant juice, and the like, the microorganisms causing lactic acid fermentation, the fermentation conditions, temperature, and duration, the baking methods, and the like may be made by those skilled in the art in accordance with the principles set forth herein and in the claims annexed thereto.

The new bread-like baked goods are characterized by their high sugar content of and especially by their high lactose content. Said sugar content, calculated as lactose, is at least 10% and their lactose content is at least 2%. Furthermore, said new baked goods are characterized by a high lactic acid content which is at least 4%. Their salt content is considerably lower and their vitamin content is considerably higher than that of standard bread.

I claim:

1. In a process of preparing bread-like baked goods, the steps comprising treating coarsely ground cereals with sufficient amounts of water to cause the cereals to swell while simultaneously aerating and irradiating said cereals with actinic rays, thereby maintaining the temperature between about 80° C. and about 100° C. for about 10 hours and excluding harmful microorganisms during said treatment, admixing flour to said swelled irradiated cereals, thereby maintaining a temperature between about 80° C. and about 100° C. and operating under sterile conditions, said flour being pretreated, before admixture, with water at a temperature between about 80° C. and about 100° C. for about 10 hours and being irradiated with actinic rays, the amount of pretreated flour added being sufficient to produce a preliminary dough, subjecting the resulting dough to a fermentation process with the addition of phosphatides for about 3 to 4 hours, again admixing flour being pretreated with water at a temperature between about 80° C. and about 100° C. for about 10 hours and being irradiated with actinic rays, at a temperature between about 80° C. and about 100° C. to said preliminary dough, again subjecting the resulting dough to a fermentation process for about 3 to 4 hours, repeating said admixing of pretreated and irradiated flour and said fermentation with the addition of phosphatides, adjusting the consistency of the resulting final dough to the required consistency, and subsequently baking said dough.

2. In a process of preparing bread-like baked goods, the steps comprising treating coarsely ground cereals with sufficient amounts of water to cause the cereals to swell while simultaneously aerating and irradiating said cereals with actinic rays, thereby maintaining the temperature of about 100° C. for about 10 hours and excluding harmful microorganisms during said treatment, admixing flour to said swelled irradiated cereals, thereby maintaining a temperature between about 80° C. and about 100° C. and operating under sterile conditions, said flour being pretreated, before admixture, with water at a temperature of about 100° C. for about 10 hours and being irradiated with actinic rays, the amount of pretreated flour added being sufficient to produce a preliminary dough, subjecting the resulting dough to a fermentation process with the addition of phosphatides for about 3 to 4 hours, again admixing flour being pretreated with water at a temperature of about 100° C. for about 10 hours and being irradiated with actinic rays, at a temperature between about 80° C. and about 100° C. to said preliminary dough, again subjecting the resulting dough to a fermentation process for about 3 to 4 hours, repeating said admixing of pretreated and irradiated flour and said fermentation with the addition of phosphatides, adjusting the consistency of the resulting final dough to the required consistency, and subsequently baking said dough.

3. In a process of preparing bread-like baked goods, the steps comprising treating coarsely ground cereals with sufficient amounts of water to cause the cereals to swell while simultaneously aerating and subjecting said cereals to the action of ultraviolet rays, thereby maintaining the temperature between about 80° C. and about 100° C. for about 10 hours and excluding harmful microorganisms during said treatment, admixing flour to said swelled irradiated cereals, thereby maintaining a temperature between about 80° C. and about 100° C. and operating under sterile conditions, said flour being pretreated, before admixture, with water at a temperature between about 80° C. and about 100° C. for about 10 hours and being subjected to the action of ultraviolet rays, the amount of pretreated flour added being sufficient to produce a preliminary dough, subjecting the resulting dough to a fermentation process with the addition of phosphatides for about 3 to 4 hours, again admixing flour being pretreated with water at a temperature between about 80° C. and about 100° C. for about 10 hours and being subjected to the action of ultraviolet rays, at a temperature between about 80° C. and about 100° C. to said preliminary dough, again subjecting the resulting dough to a fermentation process for about 3 to 4 hours, repeating said admixing of pretreated and irradiated flour and said fermentation with the addition of phosphatides, adjusting the consistency of the resulting final dough to the required consistency, and subsequently baking said dough.

4. In a process of preparing bread-like baked goods, the steps comprising treating coarsely ground cereals with sufficient amounts of water to cause the cereals to swell while simultaneously aerating and subjecting said cereals to the action of infrared rays, thereby maintaining the temperature between about 80° C. and about 100° C. for about 10 hours and excluding harmful microorganisms during said treatment, admixing flour to said swelled irradiated cereals, thereby maintaining a temperature between about 80° C. and about 100° C. and operating under sterile conditions, said flour being pretreated, before admixture, with water at a temperature between about 80° C. and about 100° C. for about 10 hours and being subjected to the action of infrared rays, the amount of pretreated flour added being sufficient to produce a preliminary dough, subjecting the resulting dough to a fermentation process with the addition of phosphatides for about 3 to 4 hours, again admixing flour being pretreated with water at a temperature between about 80° C. and about 100° C. for about 10 hours and being subjected to the action of infrared rays, at a temperature between about 80° C. and about 100° C. to said preliminary dough, again subjecting the resulting dough to a fermentation process for about 3 to 4 hours, repeating said admixing of pretreated and irradiated flour and said fermentation with the addition of phosphatides, adjusting the consistency of the resulting final dough to the required consistency, and subsequently baking said dough.

5. In a process of preparing bread-like baked goods, the steps comprising continuously turning over and agitating coarsely ground cereals under sterile conditions at a temperature between about 80° C. and about 100° C. for about 10 hours with sufficient amounts of water to cause the cereals to swell and with aqueous plant extracts selected from the group consisting of aqueous extracts of carrots, spinach, marjoram, elderberries, and peppermint while aerating and irradiating said cereals with actinic rays during said heat treatment with water, mashing the resulting swelled and irradiated cereals, cooling the mash to a temperature not substantially exceeding 60° C., admixing thereto materials yielding lactic acid on fermentation with lactic acid bacteria, subjecting the mixture to fermentation by the admixture of lactic acid bacteria cultures for about 3 to 4 hours, adjusting the consistency of the resulting fermented dough to the required consistency, and subsequently baking said dough.

6. A process according to claim 5, wherein the coarsely ground cereals used as starting material are a mixture of coarsely ground rye, oat, wheat, and barley.

7. A process according to claim 5, wherein the aqueous plant extract is a decoction of carrots and spinach.

8. A process according to claim 5, wherein the aqueous plant extract is a decoction of marjoram, elderberries, and peppermint.

9. A process according to claim 5, wherein fermentation by means of lactic acid bacteria is effected with the addition of phosphatides.

10. A process according to claim 9, wherein fermentation by means of lactic acid bacteria is effected with the addition of onion and garlic juice.

11. A process according to claim 5, wherein light of short wavelength is employed for irradiation.

12. A process according to claim 5, wherein light of long wavelength is employed for irradiation.

13. In a process of preparing bread-like baked goods, the steps comprising intimately mixing coarsely ground cereals with water and an aqueous plant extract at a temperature of about 100° C. for about 10 hours, thereby exposing said cereals to the action of actinic rays selected from the group consisting of light of short wavelength and light of long wavelength, aerating the mixture, and maintaining sterile conditions, mashing the resulting swelled and irradiated cereals, admixing flour at a temperature of about 100° C. thereto, said flour being pretreated with boiling water for about 10 hours and being exposed to the action of actinic rays selected from the group consisting of light of short wavelength and light of long wavelength, the amount of pretreated flour added being sufficient to produce a preliminary dough, admixing milk products containing the milk carbohydrates to said preliminary dough, adding cultures of lactic acid bacteria and phosphatides thereto, causing fermentation of the resulting mixture at a temperature substantially not exceeding 60° C. for about 3 to 4 hours, again admixing flour pretreated with boiling water for about 10 hours and exposed to the action of actinic rays, at a temperature of about 100° C. to said fermented preliminary dough, again subjecting the resulting dough to the fermentative action of lactic acid bacteria at a temperature not substantially exceeding 60° C. for about 3 to 4 hours, repeating said admixing of pretreated and irradiated flour and said fermentation by means of lactic acid bacteria with the addition of phosphatides, adjusting the consistency of the resulting fermented final dough to the required consistency, and baking said final dough according to the steam pressure baking process.

14. A process according to claim 13, wherein fermentation is carried out in the presence of onion and garlic juice.

15. A process according to claim 13, wherein the milk products containing the milk carbohydrates are selected from the group consisting of buttermilk, lactose, and whey.

16. A process according to claim 13, wherein fermentation is carried out at a temperature of about 40° C.

References Cited in the file of this patent

UNITED STATES PATENTS

| | | |
|---|---|---|
| 771,795 | Gilmor | Oct. 4, 1904 |
| 1,355,129 | Corby | Oct. 12, 1920 |
| 1,576,664 | Lindsey et al. | Mar. 16, 1926 |
| 1,660,839 | Herendeen | Feb. 28, 1928 |
| 1,936,718 | Jordan | Nov. 28, 1933 |
| 2,060,264 | Swift | Nov. 10, 1936 |
| 2,248,526 | Francois | July 8, 1941 |
| 2,264,721 | Savale | Dec. 2, 1941 |

OTHER REFERENCES

"A Treatise on Baking," by J. E. Wihlfahrt, 1934, publ. by Standard Brands Inc. (New York), p. 368.